United States Patent [19]
Spencer

[11] 3,885,403
[45] *May 27, 1975

[54] DEVICE FOR USE AS A HOT AND COLD COMPRESS

[75] Inventor: Jacob J. Spencer, Woodbury, N.Y.

[73] Assignee: Nortech Laboratories, Inc., North Bellmore, N.Y.

[ * ] Notice: The portion of the term of this patent subsequent to Dec. 25, 1990, has been disclaimed.

[22] Filed: Aug. 16, 1973

[21] Appl. No.: 388,865

Related U.S. Application Data

[63] Continuation-in-part of Ser. No. 164,368, July 20, 1971, Pat. No. 3,780,537.

[52] U.S. Cl. .................... 62/530; 165/46; 150/2.1; 128/403; 128/399
[51] Int. Cl. ............................................. F25d 3/08
[58] Field of Search .......... 62/530; 165/46; 150/2.1; 128/403, 399

[56] References Cited
UNITED STATES PATENTS

| | | | |
|---|---|---|---|
| 2,203,591 | 6/1940 | Brown | 62/530 |
| 2,378,087 | 6/1945 | Kearney | 62/530 |
| 2,515,582 | 7/1950 | Beckwith | 62/530 |
| 2,595,328 | 5/1952 | Bowen | 62/530 |
| 2,697,424 | 12/1954 | Harma | 62/530 |
| 2,803,115 | 8/1957 | Shepherd | 62/530 |
| 3,075,529 | 1/1963 | Young | 128/403 |
| 3,545,230 | 12/1970 | Morse | 62/530 |
| 3,780,537 | 12/1973 | Spencer | 62/530 |

Primary Examiner—William J. Wye
Attorney, Agent, or Firm—Nolte and Nolte

[57] ABSTRACT

A device for use as a hot and cold compress comprises a tough flexible envelope of plastic material within which is a gel which maintains a gel-like consistency over a wide temperature range.

10 Claims, 2 Drawing Figures

PATENTED MAY 27 1975

3,885,403

DEVICE FOR USE AS A HOT AND COLD COMPRESS

This is a continuation-in-part of application Ser. No. 164,368, filed July 20, 1971 now U.S. Pat. No. 3,780,537.

This invention is concerned with a device for use as a hot and cold compress and which is reusable.

Existing devices to these ends have generally comprised ice bags or poultices. The ice bag has the drawback that it is messy and that it does not closely and comfortably conform to the part of the body to which it is to be applied because of the rigid contents of the bag. Poultices such as kaolin poultices are of course notoriously messy and they are not reusable.

The present invention seeks to provide a device which can be used optionally as a hot or as a cold compress, one which is reusable and which will closely and comfortably conform to the part of the body to which it is to be applied and one of which the preparation and use is simple and clean.

According to one aspect of this invention there is provided a tough envelope containing a liquid or paste or gel which has a low freezing point and a high boiling point. Preferably the liquid is a gel which maintains its gel-like consistency over a wide temperature range. The gel is non-toxic and non-irritating, even to an open wound, which is important in case the envelope leaks, but has a sufficiently unpleasant taste to discourage children from consuming it.

In a preferred form the gel is formulated from water and, as a freezing point depressant, glycerine and/or propylene glycol with a thickening agent. The preferred thickening agent is Carbopol 940 (which is a B.F. Goodrich Chemical Co. trademark for carboxy vinyl polymer of high molecular weight). This thickening agent is preferred for its ready suspendability in the glycerine-water mixture, the clarity of the gel formed containing it and its non-toxicity. Since this thickening agent is acidic, a neutralizing agent is added so that the gel will have a pH of about 7. For reasons of economy, NaOH is the preferred neutralizing agent. However, alternatively there may be used, for example, ammonium hydroxide or an organic amine such as monoethanolamine, triethanolamine, diisopropanolamine, di(2-ethylhexyl)-amine, triamylamine, Ethomeen C-25 and the like. The preferred weight proportion of the Carbopol 940, based on the total weight of the water and glycerine and/or propylene glycol is from about 1 to about 4%; the weight proportion of neutralizing agent is generally about 10 to about 20% based on the weight of the Carbopol 940 when the neutralizing agent is sodium or ammonium hydroxide and about 20 to about 40% when the neutralizing agent is an organic amine. The proportion of ammonium hydroxide is calculated as ammonia. Desirably a fungistat additive is used to inhibit the growth of fungus. That additive may for example be methyl paraben, which is preferred due to its non-toxicity and reasonable cost.

The relative proportions of the water to the glycerine and/or propylene glycol by weight are about 1:1 to about 7:3.

It is convenient to form the envelope of the device of a transparent thermoplastic film such as polyethylene, polypropylene, polyethylene terephthalate and the like, which is both flexible and tear and puncture resistant.

Reference is made to the accompanying drawings in which.

Figure 1:
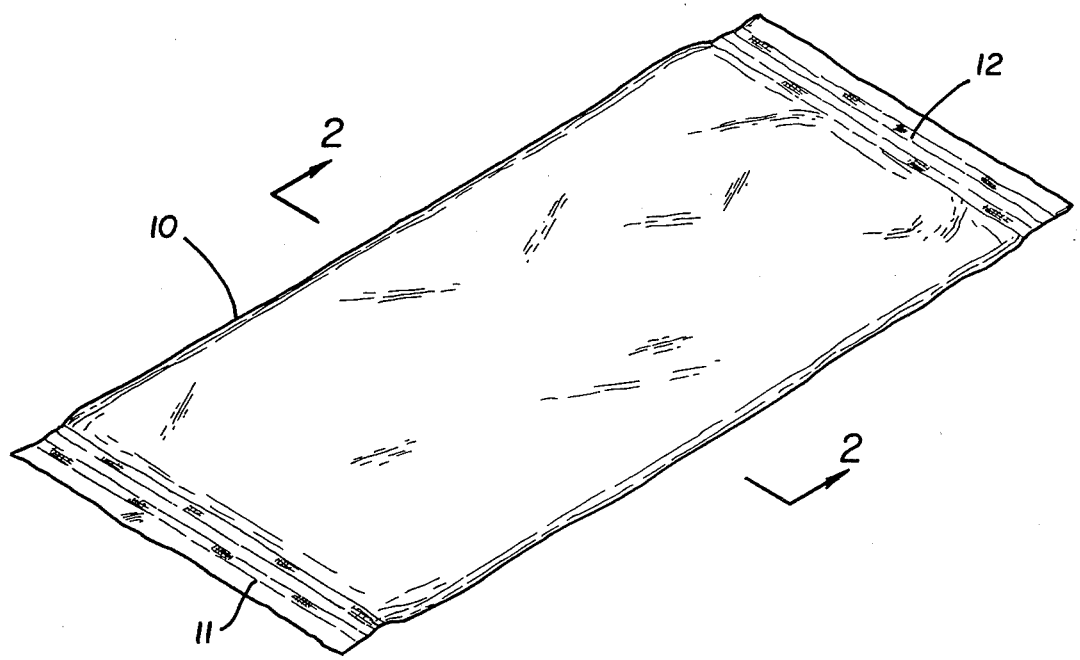
FIG. 1 is a perspective view of the device of this invention.
Figure 2:
FIG. 2 is a section on the line 2—2.

In the drawing the device comprises a generally rectangular envelope 10 which is sealed at its opposite ends 11 and 12 in conventional fashion to enclose a quantity of a gel-like material which fills the envelope sufficiently to enable that envelope to be closely conformed to the body.

In use the envelope would be put into a freezer or other chilling device for use as a cold compress or would be put into hot water to be used as a hot compress. The material within the envelope is a gel which will maintain its gel-like consistency over a range of temperatures from about 0° to about 212°F.

A particularly desirable gel is formed as follows. To produce about 400 pounds of gel, 235.5 pounds of water, 160 pounds of glycerine, 240 grams of methyl paraben, 11 grams of peacock blue (a water soluble dye), 4 pounds of Carbopol 940 and 180 grams of sodium hydroxide are mixed according to the following method:

200 lbs. of water is placed in a 55 gallon drum and agitated at high speed during the rapid introduction of 4 lbs. of Carbopol. The agitation is maintained until all the Carbopol is dispersed.

Methyl paraben, an antiseptic and fungus growth inhibitant, is dispersed in 2.5 lbs. of hot water and is added to the mixed water and Carbopol as agitation continues.

The glycerine is then added and the dye dissolved in 2.5 lbs. of water and added to the mixture slowly.

Agitation is continued for about an hour or until all the particles are dissolved.

The sodium hydroxide is then mixed in 25.5 lbs. of water and is dissolved completely and added rapidly to the mixture. The mixture is then stirred slowly until the product is completely gelled.

The water and glycerine base of the mix is used because the glycerine tends to lower the freezing point of the water and is readily miscible with the water. The methyl paraben inhibits the growth of mold and the Carbopol thickens the mixture.

Because Carbopol is acid, sodium hydroxide is added as a neutralizer. The dye is added to give to the resultant gel a pleasant appearance.

It is to be noted that the gel is non-toxic and that it will maintain its consistency over a fairly wide temperature range which will facilitate its use as a hot and a cold compress.

What is claimed is:

1. A hot and cold compress comprising a tough, flexible, sealed envelope and a neutral gel within said envelope, said gel being comprised of a mixture of water, a freezing point depressant selected from the group consisting of glycerine, propylene glycol and mixtures thereof and a thickening agent, the relative proportions of the water to the freezing point depressant by weight being about 1:1 to about 7:3, said gel maintaining its gel-like consistency over a temperature range of about 0° to about 212°F.

2. A compress according to claim 1, in which the gel further comprises a fungistat.

3. A compress according to claim 2, in which the fungistat comprises methyl paraben.

4. A compress according to claim 1, in which the thickening agent is acidic and the gel further comprises a neutralizing agent.

5. A compress according to claim 4, in which the thickening agent comprises carboxy vinyl polymer.

6. A compress according to claim 5, in which the neutralizing agent comprises sodium hydroxide.

7. A compress according to claim 4, in which the gel further comprises a fungistat.

8. A compress according to claim 5, in which the fungistat comprises methyl paraben.

9. A compress according to claim 8, in which the thickening agent comprises carboxy vinyl polymer.

10. A compress according to claim 9, in which the weight proportion of the polymer based on the total weight of the water and the freezing point depressant is about 1 to about 4%.

* * * * *